United States Patent
Amparore et al.

(10) Patent No.: US 8,820,189 B2
(45) Date of Patent: *Sep. 2, 2014

(54) ARTICULATED ROBOT WRIST

(75) Inventors: Mauro Amparore, Grugliasco (IT);
Giorgio Pernechele, Grugliasco (IT);
Giuseppe Paparella, Grugliasco (IT)

(73) Assignee: Comau S.p.A., Gruglaisco (Torino) (IT)

( * ) Notice: Subject to any disclaimer, the term of this patent is extended or adjusted under 35 U.S.C. 154(b) by 294 days.

This patent is subject to a terminal disclaimer.

(21) Appl. No.: 13/399,353

(22) Filed: Feb. 17, 2012

(65) Prior Publication Data

US 2012/0216650 A1    Aug. 30, 2012

(30) Foreign Application Priority Data

Feb. 24, 2011    (IT) .............................. TO2011A0156

(51) Int. Cl.
*G05G 11/00*    (2006.01)
*B25J 17/02*    (2006.01)
*B25J 19/00*    (2006.01)

(52) U.S. Cl.
CPC .......... *B25J 19/0025* (2013.01); *B25J 17/0283* (2013.01)
USPC ................... 74/490.06; 74/490.03; 74/490.01

(58) Field of Classification Search
USPC ............... 74/490.01, 490.02, 490.03, 490.04, 74/490.05, 490.06, 490.07; 901/24
See application file for complete search history.

(56) References Cited

U.S. PATENT DOCUMENTS

| | | | |
|---|---|---|---|
| 5,222,409 A * | 6/1993 | Dalakian .................... | 74/479.01 |
| 5,606,235 A * | 2/1997 | Mauletti ....................... | 318/625 |
| 5,664,322 A * | 9/1997 | Best ............................... | 29/784 |
| 5,761,965 A * | 6/1998 | Dahlquist ................... | 74/490.03 |
| 6,347,919 B1 * | 2/2002 | Ryan et al. .................... | 414/217 |
| 6,658,962 B1 * | 12/2003 | Rosheim ..................... | 74/490.05 |
| 7,320,264 B2 * | 1/2008 | Albertsson et al. ......... | 74/490.02 |
| 7,322,258 B2 * | 1/2008 | Shiraki et al. .............. | 74/490.05 |
| 7,691,098 B2 * | 4/2010 | Wallace et al. .................... | 606/1 |
| 7,703,349 B2 * | 4/2010 | Nihei et al. ................ | 74/490.02 |

(Continued)

FOREIGN PATENT DOCUMENTS

| | | |
|---|---|---|
| EP | 0 502 832 A1 | 9/1992 |
| EP | 1 930 129 A1 | 6/2008 |

(Continued)

OTHER PUBLICATIONS

Italian Search Report, Dated Oct. 6, 2011.

*Primary Examiner* — David M Fenstermacher
(74) *Attorney, Agent, or Firm* — Young Basile Hanlon & MacFarlane P.C.

(57) ABSTRACT

Disclosed herein are embodiments of an articulated robot wrist which can comprise a first body comprising a first and a second end, said first end being intended to be mounted on a robot component that is rotatable around a first axis; a second body comprising a first and a second end, said first end being rotatably mounted on said second end of said first body, around a second axis inclined with respect to said first axis; and a third body comprising a first and a second end, said first end being rotatably mounted on said second end of said second body, around a third axis inclined with respect to said second axis, wherein said first and third axes are both substantially orthogonal to said second axis, and wherein in at least one position of said robot wrist said first and third axes are substantially aligned with each other.

10 Claims, 4 Drawing Sheets

(56) References Cited

U.S. PATENT DOCUMENTS

| | | |
|---|---|---|
| 7,780,651 B2 * | 8/2010 | Madhani et al. .................. 606/1 |
| 7,878,088 B2 * | 2/2011 | Tamura et al. ............. 74/490.01 |
| 7,914,522 B2 * | 3/2011 | Morley et al. ..................... 606/1 |
| 8,006,586 B2 * | 8/2011 | Tealdi et al. ............... 74/490.02 |
| 8,052,185 B2 * | 11/2011 | Madhani ....................... 294/106 |
| 8,343,141 B2 * | 1/2013 | Madhani et al. .................. 606/1 |
| 8,396,596 B2 * | 3/2013 | Oka et al. ....................... 700/258 |
| 8,398,355 B2 * | 3/2013 | Holtkamp et al. ............ 414/217 |
| 8,425,620 B2 * | 4/2013 | Johnson et al. ................. 623/57 |
| 8,631,720 B2 * | 1/2014 | Nakagiri et al. ........... 74/490.02 |

FOREIGN PATENT DOCUMENTS

| | | |
|---|---|---|
| EP | 1 970 171 A1 | 9/2008 |
| JP | 88/00515 A1 | 1/1988 |
| JP | 2006-289503 | 10/2006 |
| JP | 2006-289503 A | 10/2006 |
| WO | 88 00515 A1 | 1/1988 |

* cited by examiner

ARTICULATED ROBOT WRIST

FIELD OF INVENTION

The present invention relates in general to an articulated robot wrist.

BACKGROUND

A robot wrist of the above indicated type is disclosed for example in Japanese patent application JP 2006-289503.

SUMMARY

Disclosed herein are embodiments of an articulated robot wrist. One embodiment is of the type comprising a first body comprising a first and a second end, said first end of said first body being intended to be mounted on a robot component that is rotatable around a first axis. A second body comprises a first and a second end, said first end of said second body being rotatably mounted on said second end of said first body around a second axis inclined with respect to said first axis. A third body comprises a first and a second end, said first end of said third body being rotatably mounted on said second end of said second body around a third axis inclined with respect to said second axis.

The first and third axes are both substantially orthogonal to said second axis, and in at least one position of said robot wrist, said first and third axes are substantially aligned to each other.

The first body comprises a substantially elbow-shaped portion having at its base a first opening which is directed towards said second and third bodies and which is substantially aligned to said first axis in the mounted condition of said robot wrist. The elbow-shaped portion carries an offset portion, substantially arranged side by side and spaced apart with respect to the axis of the said first opening and on which there is provided said second end of said first body.

The second body comprises a cantilever portion, corresponding to said second end of said second body, which has a second opening substantially aligned to said third axis, in the mounted condition of said robot wrist said first and second openings being traversed by cables and/or tubes for the supply and/or control of a device associated to said third body of the robot wrist.

The robot wrist further comprises means for driving rotation of said second and third bodies, around said second and third axes, respectively, wherein said means for driving rotation of said second and third bodies comprise a first motor carried by said first body, first gear means for transmission of the rotation of the output shaft of said first motor to said second body, a second motor carried by said second body and second gear means for transmission of the rotation of the output shaft of said second motor to said third body.

The object of the present invention is that of improving a robot wrist of this type, in particular by providing a structure more compact and simpler. The claims form integral part of the technical teaching which is provided herein with reference to the invention.

BRIEF DESCRIPTION OF THE DRAWINGS

The invention will be now described, purely by way of non-limiting example, with reference to the annexed drawings, in which.

DETAILED DESCRIPTION OF EMBODIMENTS

Figure 1:
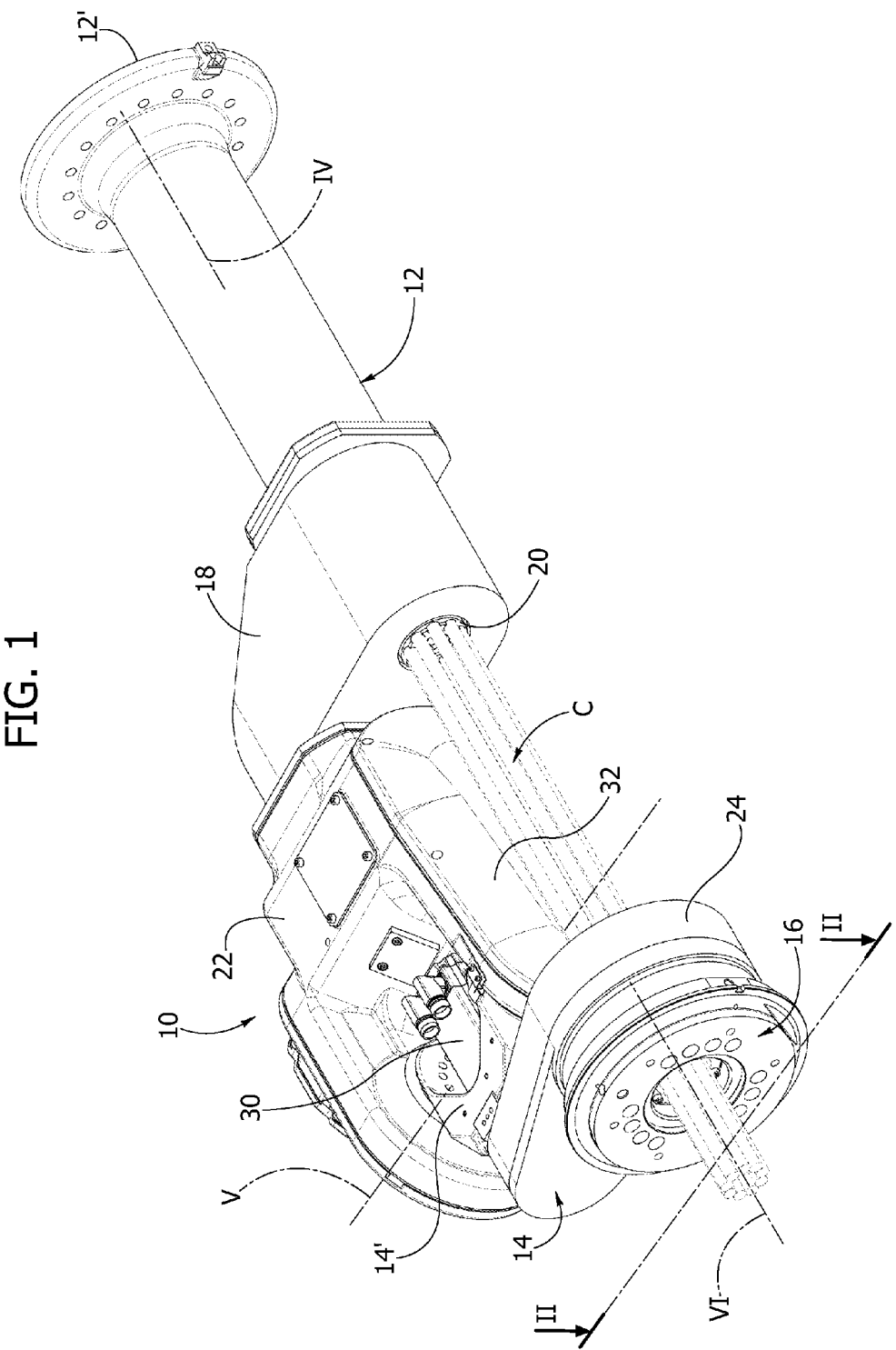
FIG. 1 represents a perspective view of a first embodiment of the robot wrist described herein.

In the following description various specific details are described in order to provide thorough understanding of the embodiments. The embodiments may be provided for example without one or more of these specific details, or through other methods, components or materials etc.

In other cases, known structures, materials or operations are not shown nor described in detail to avoid a bulky description of the various aspects of the embodiments. Therefore, references as used herein are only for convenience and do not define the scope of protection or the scope of the embodiments.

In the figures, reference numeral 10 designates an articulated robot wrist. As known in the art, a robot of this type is to be mounted on a robot component and is to be provided with a tool or other operating apparatus which is supplied and/or controlled with cables and/or tubes which are directly associated with the structure of the wrist itself. These cables and/or tubes are shown diagrammatically in the figures and designated by reference C. They define what is called the "harness" of the robot wrist, the robot wrist being defined as being "harnessed" once the cables and/or tubes have been mounted thereon. These aspects will not be discussed herein in detail, since they are per se conventional in the art and will be explained only to the extent which is necessary for describing the wrist of the invention.

Wrist 10 comprises a first body 12 including a first end 12' and a second end 32. The first end 12' is to be mounted on a robot component (not shown) which is rotatable around a first axis IV.

Wrist 10 further comprises a second body 14 comprising a first end 14' and a second end 24. The first end 14' is rotatably mounted on the end 32 of body 12 around a second axis V inclined with respect to the first axis IV. Furthermore, the robot wrist 10 comprises a third body 16 comprising a first end and a second end designated by reference 16". As shown in the figures, preferably the third body 16 is an annular body which is to be traversed by cables and/or tubes of the tool associated to the wrist and whose end 16" has a surface on which there are formed suitable seats for connection of this tool.

The first end of body 16 is rotatably mounted on the second end 24 of body 14 around a third axis VI inclined with respect to the second axis V.

Axes IV and VI form an angle substantially of 90 degrees with respect to the second axis V (in other words, axes IV and VI are both substantially orthogonal to axis V). As shown in the figures, in given positions in space of the robot wrist, these axes are substantially aligned with each other. In particular, the configuration shown in the figures is maintained for all the positions of the wrist which, with respect to that shown, are displaced only as a result of a rotation of the wrist around axis IV.

It is to be noted that in the present description, when reference is made to an orthogonal condition between two axes or straight lines, this may be applied both to the case of lines or axes which intersect each other and are perpendicular relative to each other, and to the case of lines or axes which do not intersect with each other but have their projections on a common plane parallel to them which form an angle substantially of 90 degrees relative to each other.

More specifically, as visible in figures from 1 to 4, the first body 12 comprises an elbow-shaped body 18 which has, at its base, a first opening 20 facing towards the second body 14 and the third body 16. In the mounted condition of the wrist, the opening 20 is substantially aligned with the first axis IV. Furthermore, the elbow-shaped portion carries an offset portion 22, substantially arranged side by side, and spaced apart, with respect to the axis of opening 20. On this offset portion the second body 14 is rotatably mounted around the second axis V. The second body 14 has a cantilever portion 24, corresponding to the above mentioned second end of the second body 14, which has a second opening 26 substantially aligned with the third axis VI. In the mounted and harnessed condition of the robot wrist, the first opening 20 and the second opening 26 are both traversed by cables and/or tubes C of the tool associated with the third body 16. As visible from FIG. 1, due to the general configuration which is defined by portions 18 and 22, there is formed a passage for the cables and/or tubes C such that these cables and the tubes are held within the overall lateral dimension of the robot wrist, so as to avoid that they may interfere with the operations of the wrist itself. Furthermore, in the mounted and harnessed condition of the robot, the cables and/or tubes C extend, for a portion of their length, substantially aligned with axis IV and, for another portion of their length, substantially aligned with axis VI. This condition provides a reduction to a minimum of the torsional and bending stresses to which the cables are subjected during the manoeuvres of the robot wrist.

In the robot wrist described herein, the means for driving the rotation of the second body and the third body are mounted directly on the structure of the wrist itself. In particular the driving means comprise a first motor 28, which is carried by the first body 12 and drives rotation of the second body 14. The driving means further comprise a second motor 30, which is carried by the second body 14 and drives rotation of the third body 16. As will be seen more in detail in the following, the driving means comprise first gear means for transmitting the rotation of the output shaft of said first motor 28 to said second body 14, and second gear means for transmitting the rotation of the output shaft of the second motor 30 to the third body 16. In various embodiments, as well as in those shown in the figures, the first motor 28 is carried by the offset portion 22. Furthermore, at its end opposite to the elbow-shaped portion 18, the offset portion 22 of the first body has a fork-shaped portion 32, corresponding to said second end portion of the first body. This fork-shaped portion 32 is arranged side by side, and spaced apart, with respect to the axis of opening 20, and the second body 14 is rotatably mounted thereon, around second axis V. In various embodiments, as well as in those shown in the figures, second motor 30 is mounted on the end portion 14' of the second body 14, between the arms 32' and 32" of the fork-shaped portion 32. In various embodiments, as well as in those shown in the figures, second body 14 rotatably engages, with its own end portion 14', both the arms 32' and 32". In various embodiments, as well as in those shown in the figures, second motor 30 is oriented so that its output shaft is substantially parallel to the third axis VI.

As visible in figures from 1 to 4, the cantilever portion 24 comprises a shaft 34 rotatably mounted around an axis that is substantially parallel to the third axis VI and set between this latter and the output shaft of the second motor 30. Shaft 34 further carries a gear wheel 36 engaging a gear wheel 38 rigidly connected to the output shaft of the second motor 30. Shaft 34 carries a gear wheel 40 engaging a gear wheel 42. Gear wheel 42 is rotatably mounted on the cantilever portion 24 around the third axis VI, and drives rotation of the third body 16.

In various embodiments, as well as in those shown in the figures, gear wheel 42 is fitted on an hollow shaft 43 carried by a reducer means 44 fixed to the cantilever portion 24. Particularly, the reducer means 44 has an overall annular shape, and is centrally traversed by shaft 43. Externally, the reducer means 44 is attached to the cantilever portion 24. The third body 16 is fixed on the reducer means 44 and connected in rotation to shaft 43 thereby.

In various embodiments, as well as in those shown in the figures, in the harnessed condition of the robot wrist the reducer means 44 and shaft 43 are both traversed by the above-mentioned cables/or tubes C.

Figure 2:
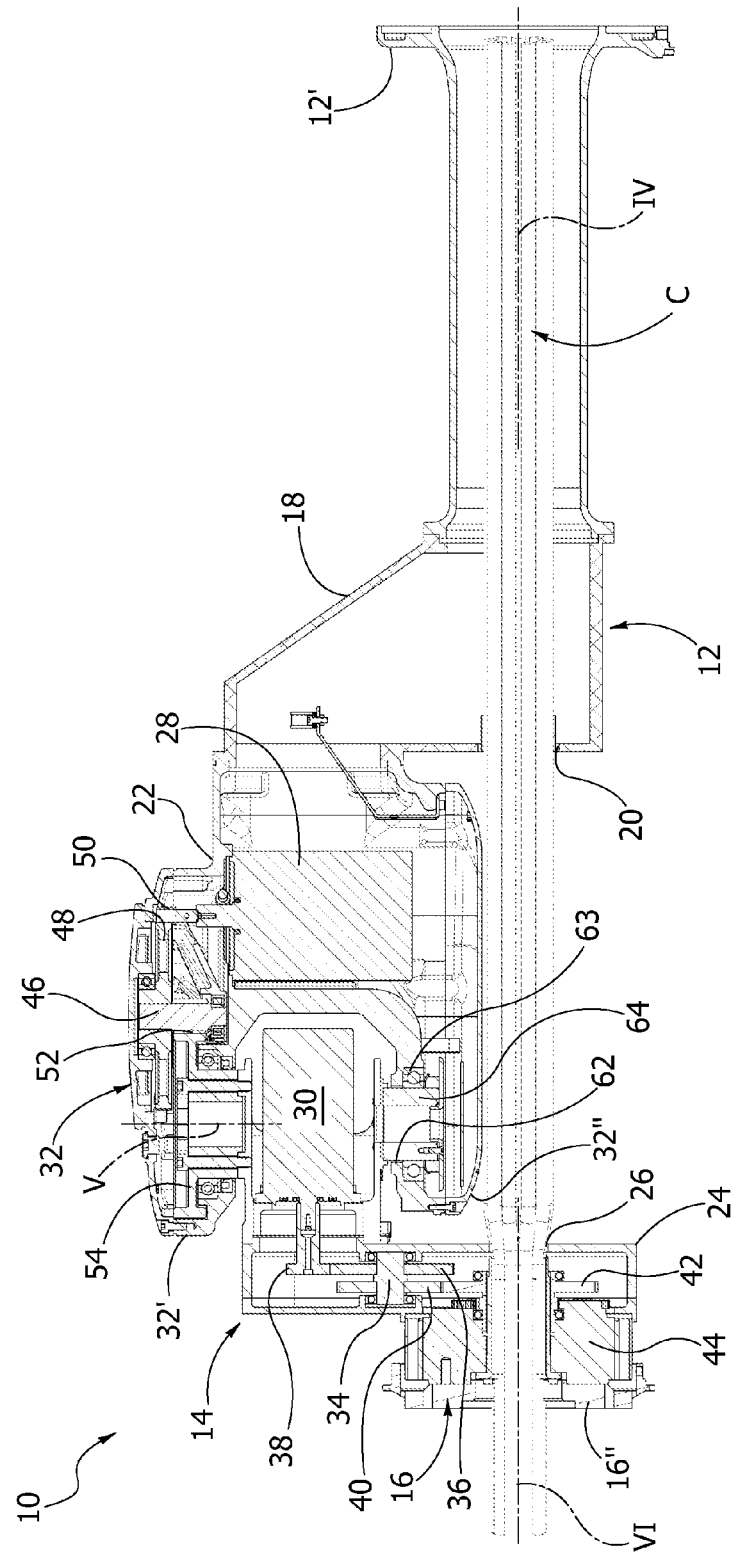
FIG. 2 represents a cross-sectional view taken along the longitudinal section plane diagrammatically shown by line II-II in FIG. 1.

In various embodiments, as well as in that shown in FIGS. 1 and 2, motor 28 is mounted on the offset portion 22, oriented so that its output shaft is substantially parallel to the second axis V and spaced apart therefrom. In preferred embodiments, shaft 46 is rotatably mounted on the offset portion 22, around an axis that is substantially parallel to the second axis V and set between this latter and the output shaft of motor 28. Shaft 46 carries a first gear wheel 48 engaged by a gear wheel 50 carried by the output shaft of the first motor 28. Shaft 46 further comprises a gear portion 52 engaging a gear wheel 54. Gear wheel 54 is rotatably mounted on arm 32' of the fork-shaped portion 32 around the second axis V. In particular, gear wheel 54 is rotatably supported by a bearing means 35. This means is blocked by gear wheel 54 against edges delimiting an opening 33 formed in the arm 32'. Through opening 33, means for fixing gear wheel 54 engages portion 14' of the second body, thus connecting in rotation portion 14' with gear wheel 54.

Figure 3:
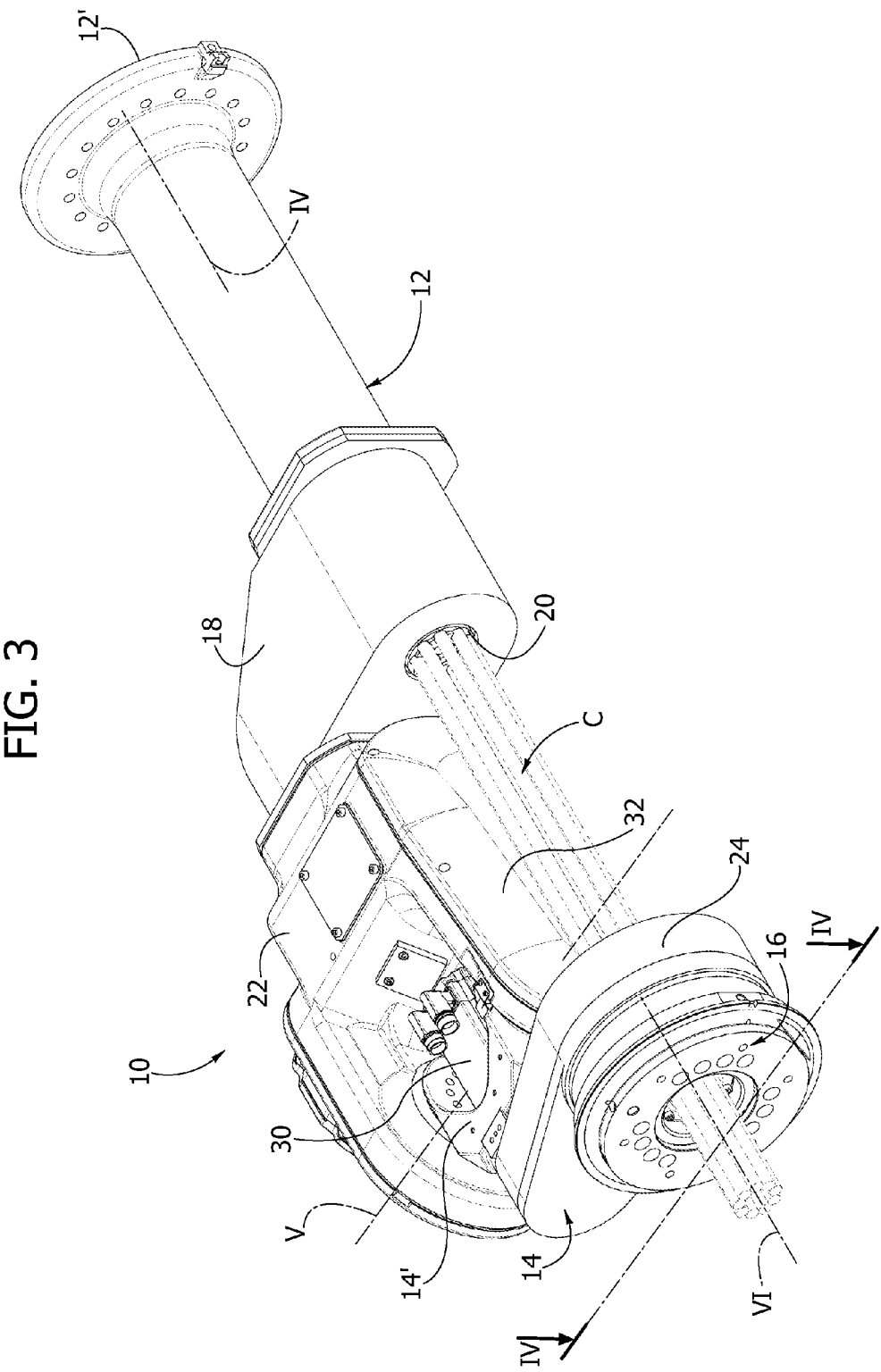
FIG. 3 shows a perspective view of a second embodiment of the robot wrist described herein.
Figure 4:
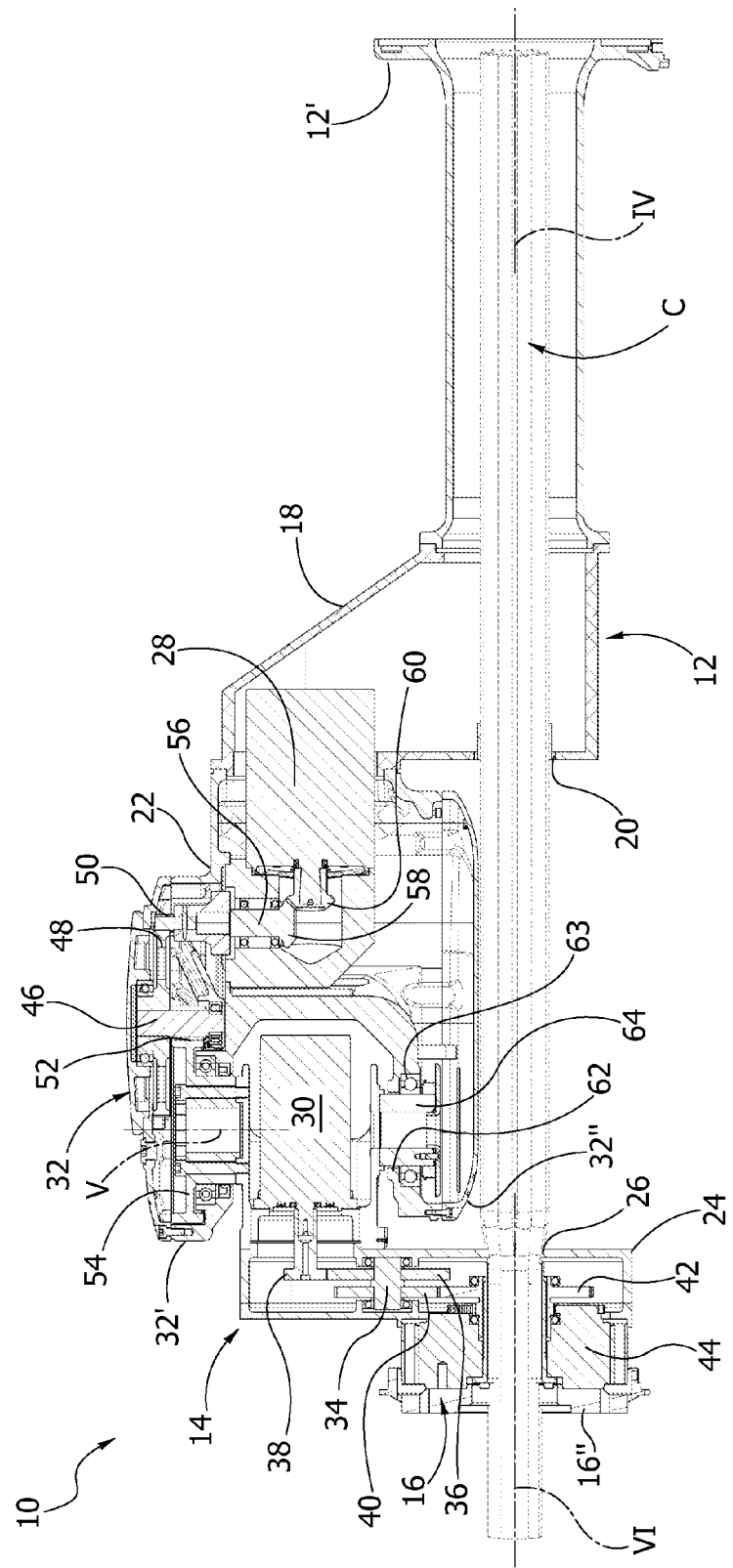
FIG. 4 represents a cross-sectional view taken along the longitudinal sectional plane diagrammatically shown by line IV-IV in FIG. 3.

In various embodiments, as well as in that shown in FIGS. 3 and 4, first motor 28 is mounted on the offset portion 22, oriented so that its output shaft is substantially parallel and spaced apart with respect to the first axis IV. In this embodiment gear wheel 50, which engages gear wheel 48 carried by shaft 46, is not directly connected to the output shaft of the first motor 28, but conversely is carried by a shaft 56. Shaft 56 is rotatably mounted on the offset portion 22, around an axis substantially parallel to the second axis V and opposite thereto with respect to shaft 46. Shaft 56 engages, by means of a conical gear portion 58 at its own end opposite to gear wheel 50, a conical gear wheel 60 fixed in rotation to the output shaft of the first motor 28.

In various embodiments, as well as in that shown in the figures, the arm 32" of the fork-shaped portion 32—which does not contain the means for driving the second body 14—has an opening 62 facing towards the space between the arms 32', 32". Arm 32", with opening 62, provides for a passage for the power cables (not shown) of the second motor 30.

In various embodiments, as well as in that shown in the figures, an annular support 64 of portion 14', intended to be traversed by the above-mentioned power cables, is rotatably supported in correspondence of opening 62, by means of a bearing member 63.

In view of the foregoing, the transmission of movement to the second and third bodies, respectively in the rotations around axes V and VI, are obtained as described in the following.

When the first motor 28 is activated, gear wheel 50 drives rotation of the shaft 46, by engaging gear wheel 48 carried thereby. By means of its gear portion 52, shaft 46 drives rotation of gear wheel 54 and, consequently, second body 14.

In the embodiment of FIGS. 3 and 4, the first motor 28 drives rotation of gear wheel 50 through the actuation of shaft 56.

When the second motor 30 is activated, the engagement between gear wheel 36 and gear wheel 38 leads to rotation of the shaft 34, which transmits the movement to the reducer means 44, by the engagement between gear wheel 40 and gear wheel 42. The reducer means 44 carries out a multiplication of torque, transmitting the movement to the third body 16.

It is finally to be noted that the above-mentioned motors 28 and 30, as well as the reducer means 44, have not been described herein in detail, since they can be of any type which is conventionally used in the field of robots. Similarly, some constructional details shown in the figure have not been described, to avoid an unnecessary complicated description, but they will be anyway clearly evident to the persons skilled in the art.

Naturally, while the principle of the invention remains the same, the details of construction and the embodiments may widely vary with respect to what has been described purely by way of non limiting example, without departing from the scope of the invention, as defined in the annexed claims.

What is claimed is:

1. An articulated robot wrist, comprising:
    a first body comprising a first and a second end, said first end of said first body being intended to be mounted on a robot component that is rotatable around a first axis;
    a second body comprising a first and a second end, said first end of said second body being rotatably mounted on said second end of said first body, around a second axis inclined with respect to said first axis; and
    a third body comprising a first and a second end, said first end of said third body being rotatably mounted on said second end of said second body, around a third axis inclined with respect to said second axis;
    wherein said first and third axes are both substantially orthogonal to said second axis, and wherein in at least one position of said robot wrist said first and third axes are substantially aligned with each other,
    wherein said first body comprises a substantially elbow-shaped portion having a base with a first opening facing towards said second and third bodies, and arranged substantially aligned with said first axis in the mounted condition of said robot wrist,
    wherein said elbow-shaped portion carries an offset portion arranged substantially side by side, and spaced apart, with respect to the axis of said first opening, with said second end of said first body being provided on said offset portion,
    wherein said second body has a cantilever portion corresponding to said second end of said second body which has a second opening substantially aligned with said third axis, and wherein in the mounted condition of said robot wrist, said first and second openings are traversed by cables and/or tubes for the supply and/or control of a device associated to said third body of said robot wrist, said robot wrist further comprising:
    means for driving rotation of said second and third bodies, around said second and third axes, respectively, wherein said means for driving rotation of said second and third bodies comprise:
    a first motor carried by said first body;
    first gear means transmitting rotation of the output shaft of said first motor to said second body;
    a second motor carried by said second body; and
    second gear means transmitting rotation of the output shaft of said second motor to said third body,
    said robot wrist being characterised in that said first motor is carried by said offset portion and in that at its end opposite to said elbow-shaped portion said offset portion of said first body has a fork-shaped portion, corresponding to said second end of said first body, which is arranged side by side and spaced apart with respect to the axis of said first opening, and on which said second body is rotatably mounted around said second axis.

2. The articulated robot wrist according to claim 1, wherein said second motor is mounted on said first end of said second body so as to be set between the arms of said fork-shaped portion.

3. The articulated robot wrist according to claim 1, wherein said first end of said second body rotatably engages both the arms of said fork-shaped portion.

4. The articulated robot wrist according to claim 2, wherein a first arm of said fork-shaped portion has an opening which faces towards the space between said arms of said fork-shaped portion, and wherein through said first arm and said opening of said first arm there run cables for the power supply of said second motor.

5. The articulated robot wrist according to claim 1, wherein said first motor is mounted within said offset portion, oriented so that its output shaft is substantially parallel, and spaced apart, with respect to said second axis.

6. The articulated robot wrist according to claim 5, wherein a shaft is rotatably mounted within said offset portion, around an axis that is substantially parallel to said second axis and set between said output shaft of said first motor and said second axis, wherein said shaft of said offset portion has a gear wheel engaged by a gear wheel of the output shaft of said first motor, and a gear wheel engaging a gear wheel that is rotatably mounted within a first arm of said fork-shaped portion around said second axis, and connected in rotation to said first end of said second body.

7. The articulated robot wrist according to claim 1, wherein said first motor is mounted within said offset portion, oriented so that its output shaft is substantially parallel, and spaced apart, with respect to said first axis.

8. The articulated robot wrist according to claim 7, wherein a first shaft is rotatably mounted within said offset portion, around an axis that is substantially parallel, and spaced apart, with respect to said second axis,
    wherein said first shaft has a gear portion engaging a first gear wheel, said first gear wheel being rotatably mounted within a first arm of said fork-shaped portion around said second axis, and connected in rotation to said first end of said second body, and wherein said first shaft has a second gear wheel engaged by a third gear wheel fixed in rotation to a second shaft,
    wherein said second shaft is rotatably mounted within said offset portion around an axis that is substantially parallel to said second axis and opposite thereto with respect to said first shaft, said second shaft engaging, by means of a conical gear portion at an end of said shaft opposite to said third gear wheel, a corresponding conical gear wheel, which is fixed in rotation to the output shaft of said first motor.

9. The articulated robot wrist according to any of the preceding claims, wherein said cantilever portion of said second body has a shaft which is rotatably mounted around an axis substantially parallel to said third axis and set between the output shaft of said second motor and said third axis, wherein said shaft of said cantilever portion has a gear wheel engaging a gear wheel fixed in rotation to the output shaft of said second motor, and a further gear wheel engaging a gear wheel rotatably mounted within the cantilever portion around a third axis, and adapted to drive rotation of said third body.

10. The articulated robot wrist according to claim 9, wherein between said gear wheel of said cantilever portion and said third body there is set a reducer means coaxial with said third axis, which is carried by said cantilever portion and is adapted to connect in rotation said gear wheel of said cantilever portion with said third body.

* * * * *